(12) United States Patent
Warmuth

(10) Patent No.: US 10,567,749 B1
(45) Date of Patent: Feb. 18, 2020

(54) MODULATION TRANSFER FUNCTION EVALUATION FOR RED/CLEAR FILTERED OPTICAL DEVICES

(71) Applicant: ZF ACTIVE SAFETY AND ELECTRONICS US LLC, Livonia, MI (US)

(72) Inventor: Matthew W. Warmuth, Northville, MI (US)

(73) Assignee: ZF ACTIVE SAFETY AND ELECTRONICS US LLC, Livonia, MI (US)

( * ) Notice: Subject to any disclaimer, the term of this patent is extended or adjusted under 35 U.S.C. 154(b) by 0 days.

(21) Appl. No.: 16/402,287

(22) Filed: May 3, 2019

(51) Int. Cl.
*H04N 17/00* (2006.01)
*G06T 7/90* (2017.01)

(52) U.S. Cl.
CPC .............. *H04N 17/002* (2013.01); *G06T 7/90* (2017.01); *G06T 2200/24* (2013.01); *G06T 2207/10024* (2013.01)

(58) Field of Classification Search
CPC ............ H04N 17/002; G06T 7/90; G06T 7/97
USPC ............ 348/187, 188, 180, 191, 175, 224.1, 348/231.6, 234, 362
See application file for complete search history.

(56) References Cited

U.S. PATENT DOCUMENTS

| | | | | |
|---|---|---|---|---|
| 6,628,329 B1* | 9/2003 | Kelly | ..................... | H04N 5/208 348/188 |
| 2012/0327293 A1* | 12/2012 | Ollila | ....................... | G02B 7/36 348/362 |
| 2014/0002674 A1* | 1/2014 | Duparre | ............... | H04N 5/2254 348/187 |
| 2014/0002675 A1* | 1/2014 | Duparre | ............... | H04N 17/002 348/187 |
| 2014/0253761 A1* | 9/2014 | Okada | ................ | H04N 5/23296 348/240.2 |
| 2014/0307123 A1* | 10/2014 | Kurahashi | .............. | H04N 9/045 348/224.1 |
| 2015/0286033 A1* | 10/2015 | Osborne | ............ | G02B 13/0015 348/345 |
| 2015/0316833 A1* | 11/2015 | Watanabe | ................ | G02B 7/28 348/345 |
| 2016/0150161 A1* | 5/2016 | Irie | ......................... | G06T 5/003 348/229.1 |

(Continued)

*Primary Examiner* — Jefferey F Harold
*Assistant Examiner* — Mustafizur Rahman
(74) *Attorney, Agent, or Firm* — Tarolli, Sundheim, Covell & Tummino LLP

(57) ABSTRACT

Systems and methods are provided for evaluating a modulation transfer function (MTF) of a device under test comprising a red/clear color filter. A pattern source provides a pattern. The device under test images the pattern to provide an image comprising a plurality of filtered pixels and a plurality of unfiltered pixels, each having an associated brightness value. An image analysis system determines, for each filtered pixel, an axis, of a plurality of axes, having a lowest curvature. A first axis of the plurality of axes is not orthogonal to a second axis. An interpolated image is generated having a new brightness value for each of the plurality of filtered pixels as a function of respective brightness values for a set of unfiltered pixels selected from a first-order Moore neighborhood of the pixel along the axis having the lowest curvature. The modulation transfer function is determined from the interpolated image.

15 Claims, 2 Drawing Sheets

(56) References Cited

U.S. PATENT DOCUMENTS

2016/0255341 A1* 9/2016 Mateti .................. G06T 5/006
  348/187
2017/0099427 A1* 4/2017 Wu ....................... G02B 7/28

* cited by examiner

MODULATION TRANSFER FUNCTION EVALUATION FOR RED/CLEAR FILTERED OPTICAL DEVICES

TECHNICAL FIELD

This invention relates to optics, and more particularly, to a modulation transfer function evaluation system for an optical device.

BACKGROUND

The modulation transfer function ("MTF") of a camera is a measurement of the camera's ability to transfer contrast at a particular resolution from an imaged object to a camera image. The MTF is a way to incorporate resolution and contrast into a single specification. MTF is one of the best tools available to quantify the overall imaging performance of a camera system in terms of resolution and contrast. As a result, knowing the MTF of each imaging lens and camera sensor within a system allows a designer to make the appropriate selection when optimizing the camera system for a particular resolution.

SUMMARY OF THE INVENTION

In accordance with an aspect of the present invention, a system is provided for evaluating a modulation transfer function (MTF) of a device under test comprising a red/clear (RCCC) color filter. A pattern source provides a pattern suitable for use in the evaluating the MTF via a slanted method. The device under test images the pattern to provide an image comprising a plurality of filtered pixels, each having an associated brightness value, and a plurality of unfiltered pixels, each having an associated brightness value. An image analysis system determines, for each of a plurality of filtered pixels, an axis of a plurality of axes having a lowest curvature. A first axis of the plurality of axes is not orthogonal to a second axis of the plurality of axes. An interpolated image is generated having a new brightness value for each of the plurality of filtered pixels as a function of respective brightness values for a set of unfiltered pixels selected from a first-order Moore neighborhood of the pixel. The set of pixels are selected along the axis having the lowest curvature. The modulation transfer function is determined from the interpolated image.

In accordance with another aspect of the present invention, a method is provided for evaluating the modulation transfer function (MTF) of a device under test comprising a red/clear (RCCC) color filter. A pattern is imaged with the device under test to provide an image comprising a plurality of filtered pixels, each having an associated brightness value, and a plurality of unfiltered pixels, each having an associated brightness value. For each of the plurality of filtered pixels, an axis of a plurality of axes having a lowest curvature is determined. A first axis of the plurality of axes is not orthogonal to a second axis of the plurality of axes. An interpolated image having a new brightness value is generated for each of the plurality of filtered pixels as a function of respective brightness values for a set of unfiltered pixels selected from a first-order Moore neighborhood of the pixel along the axis having the lowest curvature. The modulation transfer function is determined from the interpolated image.

DETAILED DESCRIPTION

One method of determining the modulation transfer function ("MTF") of a camera has been to place a set of targets at a hyper-focal distance of the camera. In one implementation of this method, printed targets are mounted to a wall. There are total of eleven targets, with one for on-axis measurements and the other ten used for off-axis measurements. The device under test ("DUT") and the targets are separated by a hyperfocal distance of the camera, and the wall targets are illuminated by an LED light panel. Reflected light from the targets is captured by the DUT, and metrics are measured and utilized to provide MTF scores of the available slant edges measured by the module. In one implementation, a slanted-edge technique in accordance with the ISO 12233 standard is employed to provide a fast and efficient way of measuring Modulation Transfer Function (MTF) of digital input devices using a normalized reflective target based on a slanted-edge method.

The slanted-edge MTF technique is an edge gradient MTF method specifically suited to MTF calculations for spatially sampled capture devices. Its main feature is the intelligent creation of a 1-D uniformly super-sampled edge profile from sequential lines of a 2-D native-sampled image whose line-to-line edge locations are slightly displaced from one another, as they would be with a slanted edge. Theoretically, this allows for unambiguous MTF estimates beyond a capture device's Nyquist frequency, always a limitation with sampled devices. Another claimed advantage is its alignment insensitivity. Indeed, the method requires that the edge be misaligned for super-sampling to occur. Unfortunately, the slanted-edge method assumes a monochrome image, and use of the method with devices having a color filter array, for example, using a Red/Clear (RCCC) filter array, requires that values for the filtered pixels in the array be interpolated.

Figure 1:
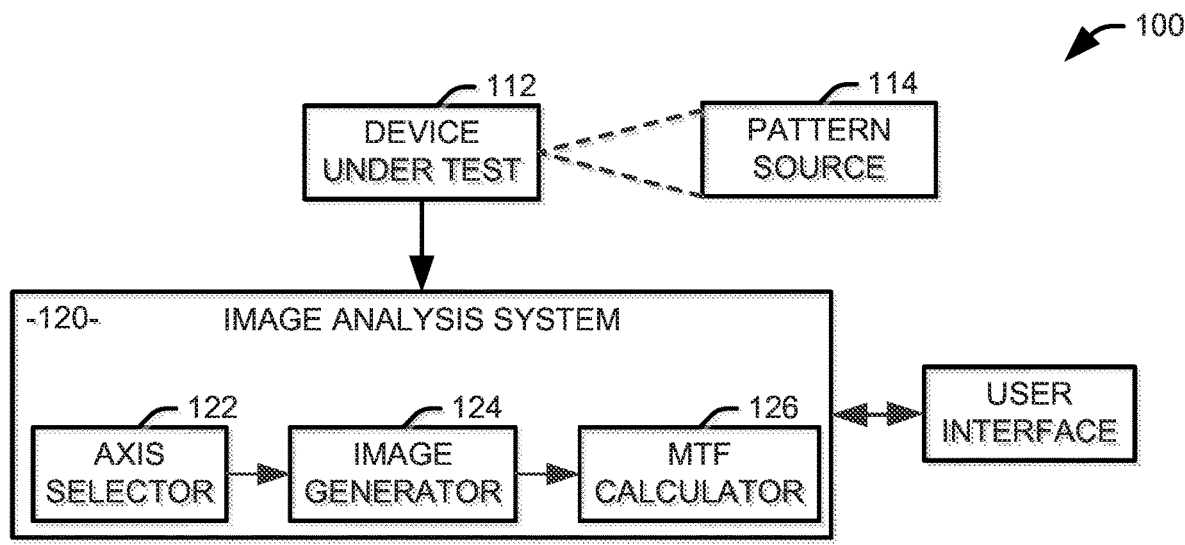
FIG. 1 illustrates an example of a system for evaluating the modulation transfer function of a device under test comprising a red/clear (RCCC) color filter.

FIG. 1 illustrates an example of a system 100 for evaluating the modulation transfer function of a device under test 112 comprising a red/clear (RCCC) color filter. The system 100 includes a pattern source 114 configured to provide a pattern representing a desired image. In one implementation, the pattern source 114 is a printed target. In another implementation, the pattern source 114 includes an appropriate coherent or non-coherent light source passed through a transparent plate having a pattern of opaque or translucent material thereon to provide the desired pattern. For example, the light source can include a laser at a desired wavelength to provide a narrow band but already collimated source of light, or a non-coherent source having a wider spectrum. Alternatively, the pattern source 114 can represent a display, such as an LCD display, provided with appropriate input to display one or more targets.

The device under test 112 images the pattern provided by the pattern source 114 to provide an image having a plurality of pixels, each represented by an associated brightness value, representing the intensity of light measured at that pixel. Because of the RCCC filter, the image includes a plurality of unfiltered pixels as well as a plurality of filtered pixels, in which only the red content of the incident light is represented. At least one image from the device under test 112 is provided to an image analysis system 120. It will be appreciated that the image analysis system 120 can be implemented as a machine-readable instructions stored on a non-transitory computer readable medium and executed by an associated processor, as dedicated hardware, for example, a field programmable gate array or an application specific integrated circuit, or as a combination of software and dedicated hardware.

The image analysis system 120 is configured to calculate an MTF for the device under test 112 from the at least one image taken at the device under test 112. The image analysis system 120 includes an axis selector 122 that determines, for each of the plurality of filtered pixels, an axis of a plurality of axes having a lowest curvature, that is, the second derivative of the brightness values at the pixel. At least one of the plurality of axes is not orthogonal to another axis of the plurality of axes. In one example, the plurality of axes includes a horizontal axis, a vertical axis, and two diagonal axes passing through the pixel. To estimate the curvature long each axis, brightness values for a set of the plurality of filtered pixels within a second-order Moore neighborhood of the pixel can be combined to provide an estimated curvature for each of the plurality of axes.

Figure 2:
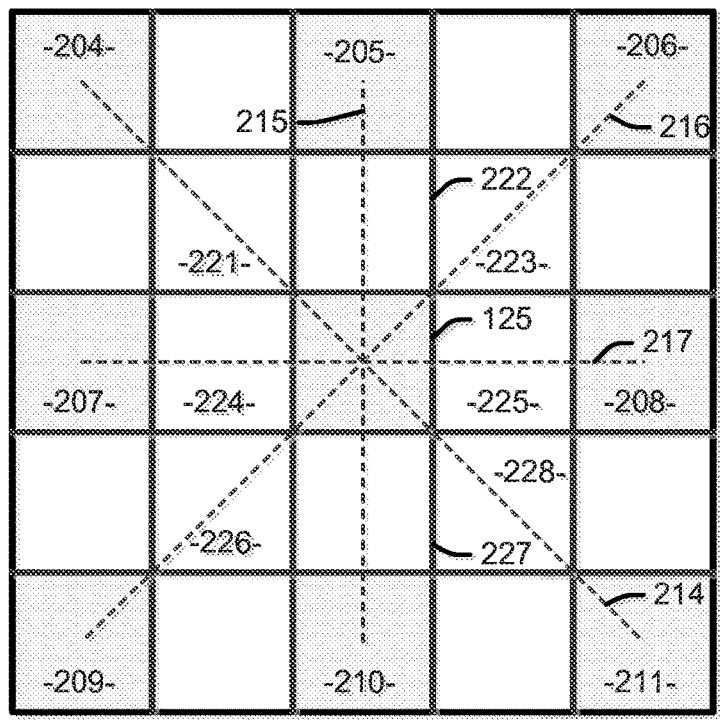
FIG. 2 illustrates an example of the second-order Moore neighborhood around a pixel.

FIG. 2 illustrates an example of the second-order Moore neighborhood 200 around a pixel 202. The pixel 202 and eight additional pixels 204-211 along the edge of the second-order Moore neighborhood 200 of the pixel are filtered pixels, shown as shaded in the diagram. Each axis 214-217 of the plurality of axes passes through the pixel 202 and two of the filtered pixels 204-211, and a local curvature for the image along each axis 214-217 is determined from the pixels along the axis. Specifically, an estimate for the curvature along each axis can be determined as a difference between a sum of the brightness values, $C_1$ and $C_2$, for two pixels (e.g., 204 and 211) along the edge of the second-order Moore neighborhood and twice the brightness value, $C_p$, of the pixel 202, such that the curvature for the axis 214-217 is estimated as $C_1+C_2-2C_p$. When the calculation of the curvature is used only for comparison to find an axis having the lowest estimated curvature, the final term can be omitted, as the value of the center pixel 202 is the same for all axes 214-217. Accordingly, the estimate for the curvature for the purpose of comparison can be determined as $C_1+C_2$ for these axes.

An image generator 124 generates an interpolated image having a new brightness value for each of the plurality of filtered pixels as a function of respective brightness values for a set of unfiltered pixels selected from a first-order Moore neighborhood of the pixel along the axis having the lowest curvature. Referring to FIG. 2, the first-order Moore neighborhood for the pixel 202 includes the pixel itself as well as pixels 221-228, all of which are unfiltered pixels. The interpolated image contains a new brightness value for each of the plurality of filtered pixels that is generated a function of respective brightness values for a set of unfiltered pixels selected from the first-order Moore neighborhood, and more specifically as the two pixels adjacent to the pixel along the selected axis. In one implementation, the new value is generated as an arithmetic mean of the brightness values for the two unfiltered pixels (e.g., 221 and 228) along the selected axis (e.g., 214).

An MTF calculator 126 determines the modulation transfer function for the device under test 112 from the interpolated image. In one example, for a selected region of interest in a target image, the MTF calculator 126 uses the slanted-edge method to generate the MTF. In this implementation, the MTF calculator 126 estimates an edge location of each of a plurality of scan lines, generates a best fit line through the center of the collective edge locations via a regression process, registers each line based on the regression fit, assigns line data into uniformly sampled bins, takes the derivative of the binned data to yield a line spread function, performs a discrete Fourier transform of a windowed portion (e.g., using a Hamming window) of the line spread function, and calculates the modulation transform function from the discrete Fourier transform. The determined MTF is then provided to a user via a user interface 130. The user interface 130 can include an output device, such as a display, as well as appropriate software for interacting with the system via one or more input devices, such as a mouse, keyboard, or touchscreen.

Figure 3:
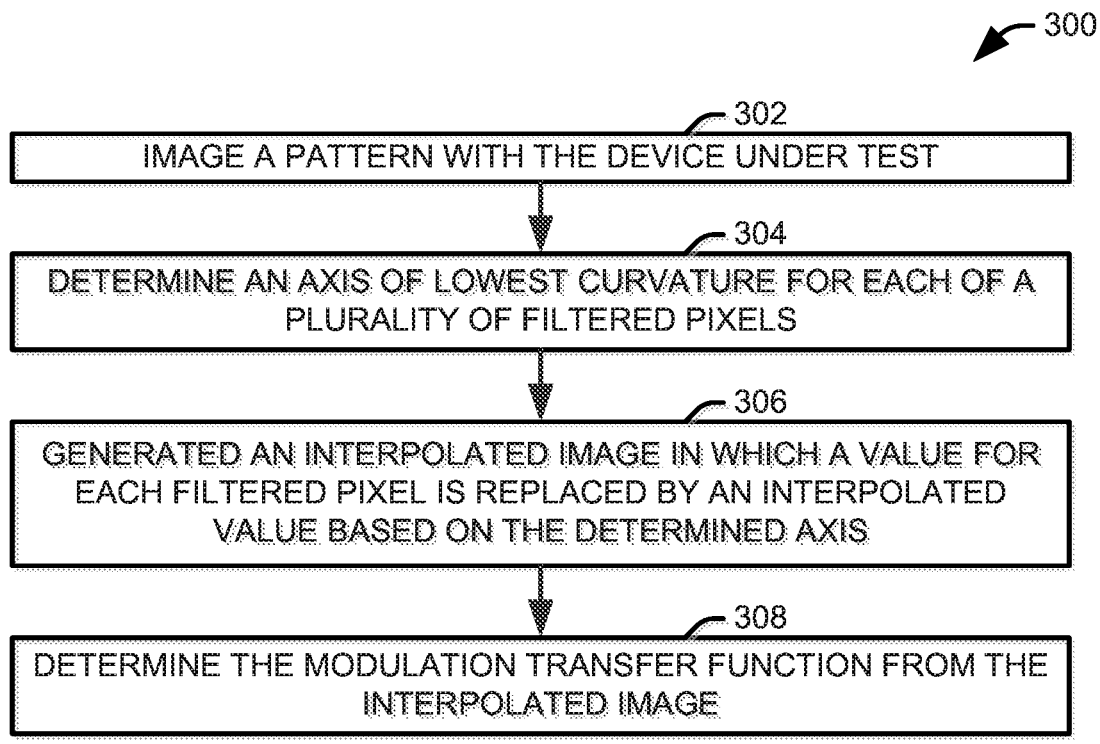
FIG. 3 illustrates a method for evaluating the modulation transfer function (MTF) of a device under test comprising a red/clear (RCCC) color filter.

In view of the foregoing structural and functional features described above in FIGS. 1 and 2, an example method will be better appreciated with reference to FIG. 3. While, for purposes of simplicity of explanation, the method of FIG. 3 is shown and described as executing serially, it is to be understood and appreciated that the present invention is not limited by the illustrated order, as some actions could in other examples occur in different orders and/or concurrently from that shown and described herein.

FIG. 3 illustrates a method 300 for evaluating the modulation transfer function (MTF) of a device under test comprising a red/clear (RCCC) color filter. At 302, a pattern is imaged with the device under test to provide an image comprising a plurality of filtered pixels, each having an associated brightness value, and a plurality of unfiltered pixels, each having an associated brightness value. At 304, for each of the plurality of filtered pixels, an axis of a plurality of axes having a lowest curvature is determined. At least a first axis of the plurality of axes forms an oblique angle with a second axis of the plurality of axes. In one example, the axis of the plurality of axes having a lowest curvature for each filtered pixel includes combining brightness values for a set of the plurality of filtered pixels within a second-order Moore neighborhood of the pixel to provide an estimated curvature for each of the plurality of axes and selecting the axis having the lowest estimated curvature. For example, each set can include a first filtered pixel that is separated from the pixel by one pixel in a first direction and a second filtered pixel that is separated from the pixel by one pixel in a second direction that is directly opposite to the first direction, and the estimated curvature for each axis can be determined as a difference between a sum of a brightness value of the first filtered pixel and a brightness value of the second filtered pixel and twice a brightness value of the pixel.

At 306, an interpolated image is generated. The interpolated image has a new brightness value for each of the plurality of filtered pixels as a function of respective brightness values for a set of unfiltered pixels selected from a first-order Moore neighborhood of the pixel selected along the axis having the lowest curvature. For example, the new brightness value can be determined as an arithmetic mean of the two pixels adjacent to the pixel along the selected axis. The modulation transfer function is then determined from the interpolated image at 308. In one example, it is determined using the slanted-edge method from the interpolated image.

Figure 4:
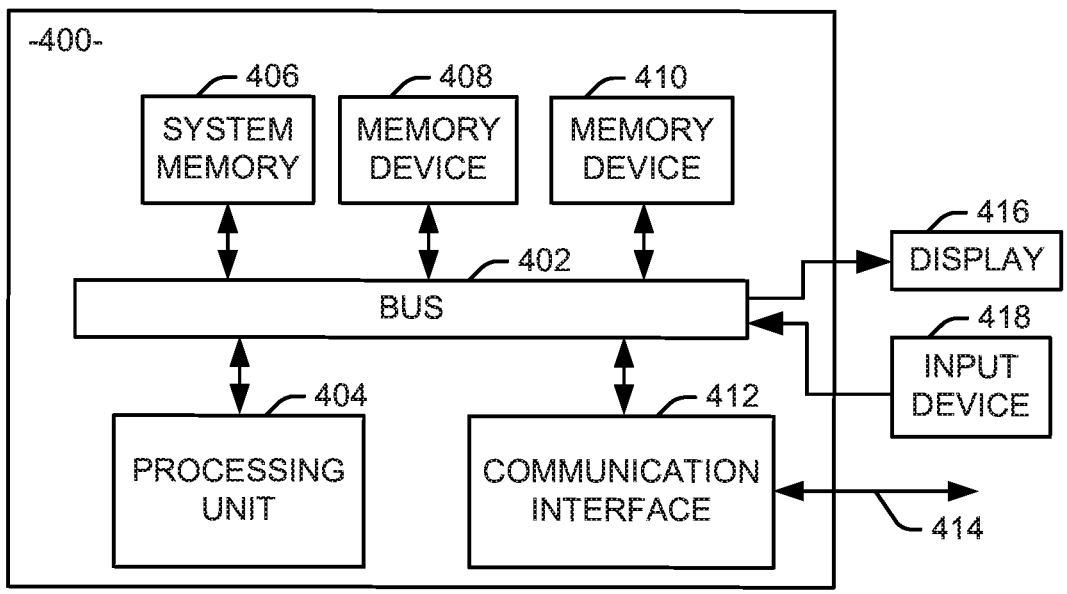
FIG. 4 is a schematic block diagram illustrating an exemplary system of hardware components capable of implementing examples of the systems and methods disclosed in FIGS. 1-3.

FIG. 4 is a schematic block diagram illustrating an exemplary system 400 of hardware components capable of implementing examples of the systems and methods disclosed in FIGS. 1-3, such as the image analysis system 120 illustrated in FIG. 1. The system 400 can include various systems and subsystems. The system 400 can be a personal computer, a laptop computer, a workstation, a computer system, an appliance, an application-specific integrated circuit (ASIC), a server, a server blade center, a server farm, etc.

The system 400 can includes a system bus 402, a processing unit 404, a system memory 406, memory devices 408 and 410, a communication interface 412 (e.g., a network interface), a communication link 414, a display 416 (e.g., a video screen), and an input device 418 (e.g., a keyboard and/or a mouse). The system bus 402 can be in communication with the processing unit 404 and the system memory 406. The additional memory devices 408 and 410, such as a hard disk drive, server, stand-alone database, or other non-volatile memory, can also be in communication with the system bus 402. The system bus 402 interconnects the processing unit 404, the memory devices 406-410, the communication interface 412, the display 416, and the input device 418. In some examples, the system bus 402 also interconnects an additional port (not shown), such as a universal serial bus (USB) port.

The processing unit 404 can be a computing device and can include an application-specific integrated circuit (ASIC). The processing unit 404 executes a set of instructions to implement the operations of examples disclosed herein. The processing unit can include a processing core.

The additional memory devices 406, 408 and 410 can store data, programs, instructions, database queries in text or compiled form, and any other information that can be needed to operate a computer. The memories 406, 408 and 410 can be implemented as computer-readable media (integrated or removable) such as a memory card, disk drive, compact disk (CD), or server accessible over a network. In certain examples, the memories 406, 408 and 410 can comprise text, images, video, and/or audio, portions of which can be available in formats comprehensible to human beings. Additionally or alternatively, the system 400 can access an external data source or query source through the communication interface 412, which can communicate with the system bus 402 and the communication link 414.

In operation, the system 400 can be used to implement one or more parts of a tissue screening system in accordance with the present invention. Computer executable logic for implementing the tissue screening system resides on one or more of the system memory 406, and the memory devices 408, 410 in accordance with certain examples. The processing unit 404 executes one or more computer executable instructions originating from the system memory 406 and the memory devices 408 and 410. The term "computer readable medium" as used herein refers to any medium that participates in providing instructions to the processing unit 404 for execution, and it will be appreciated that a computer readable medium can include multiple computer readable media each operatively connected to the processing unit.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

What have been described above are examples of the present invention. It is, of course, not possible to describe every conceivable combination of components or methodologies for purposes of describing the present invention, but one of ordinary skill in the art will recognize that many further combinations and permutations of the present invention are possible. While certain novel features of this invention shown and described below are pointed out in the annexed claims, the invention is not intended to be limited to the details specified, since a person of ordinary skill in the relevant art will understand that various omissions, modifications, substitutions and changes in the forms and details of the invention illustrated and in its operation may be made without departing in any way from the spirit of the present invention. Accordingly, the present invention is intended to embrace all such alterations, modifications, and variations that fall within the scope of the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements. No feature of the invention is critical or essential unless it is expressly stated as being "critical" or "essential."

What is claimed is:

1. A system for evaluating a modulation transfer function (MTF) of a device under test comprising a red/clear (RCCC) color filter, the system comprising:
   a pattern source that provides a pattern suitable for use in the evaluating the MTF via a slanted method;
   the device under test, which images the pattern to provide an image comprising a plurality of filtered pixels, each having an associated brightness value, and a plurality of unfiltered pixels, each having an associated brightness value; and
   an image analysis system that determines, for each of a plurality of filtered pixels, an axis of a plurality of axes having a lowest curvature, wherein a first axis of the plurality of axes is not orthogonal to a second axis of the plurality of axes, generating an interpolated image having a new brightness value for each of the plurality of filtered pixels as a function of respective brightness values for a set of unfiltered pixels selected from a first-order Moore neighborhood of the pixel, the set of pixels being selected along the axis having the lowest curvature, and determines the modulation transfer function from the interpolated image.

2. The system of claim 1, wherein the image analysis system comprises a processor and a non-transitory computer readable medium storing executable instructions executable by the processor.

3. The system of claim 1, further comprising a user interface that displays the determined modulation transfer function to a user.

4. The system of claim 1, wherein the image analysis system determines the plurality of axes having a lowest curvature for each of the plurality of filtered pixels by combining brightness values for a set of the plurality of filtered pixels within a second-order Moore neighborhood of the pixel to provide an estimated curvature for each of the plurality of axes and selecting the axis having the lowest estimated curvature.

5. The system of claim 4, wherein the set of the plurality of filtered pixels within the second-order Moore neighborhood of the pixel comprises a first filtered pixel that is separated from the pixel by one pixel in a first direction and a second filtered pixel that is separated from the pixel by one pixel in a second direction that is directly opposite to the first direction.

6. The system of claim 4, wherein the image analysis system calculates the estimated curvature as a difference between a sum of a brightness value of the first filtered pixel and a brightness value of the second filtered pixel and twice a brightness value of the pixel.

7. The system of claim 1, wherein the image analysis system generates the new brightness value for each of the plurality of filtered pixels as a function of two pixels adjacent to the pixel along the axis having the lowest curvature.

8. A method for evaluating the modulation transfer function (MTF) of a device under test comprising a red/clear (RCCC) color filter, the method comprising:
   imaging a pattern with the device under test to provide an image comprising a plurality of filtered pixels, each having an associated brightness value, and a plurality of unfiltered pixels, each having an associated brightness value;
   determining, for each of the plurality of filtered pixels, an axis of a plurality of axes having a lowest curvature, wherein a first axis of the plurality of axes is not orthogonal to a second axis of the plurality of axes; and
   generating an interpolated image having a new brightness value for each of the plurality of filtered pixels as a function of respective brightness values for a set of unfiltered pixels selected from a first-order Moore neighborhood of the pixel, the set of pixels being selected along the axis having the lowest curvature; and
   determining the modulation transfer function from the interpolated image.

9. The method of claim 8, wherein the determining the plurality of axes having a lowest curvature for each of the plurality of filtered pixels comprises:
   combining brightness values for a set of the plurality of filtered pixels within a second-order Moore neighborhood of the pixel to provide an estimated curvature for each of the plurality of axes; and
   selecting the axis having the lowest estimated curvature.

10. The method of claim 9, wherein combining brightness values for the set of the plurality of filtered pixels within the second-order Moore neighborhood of the pixel comprises selecting, for each set, a first filtered pixel that is separated from the pixel by one pixel in a first direction and a second filtered pixel that is separated from the pixel by one pixel in a second direction that is directly opposite to the first direction.

11. The method of claim 10, wherein combining brightness values for the set of the plurality of filtered pixels within the second-order Moore neighborhood comprises calculating a difference between a sum of a brightness value of the first filtered pixel and a brightness value of the second filtered pixel and twice a brightness value of the pixel.

12. The method of claim 10, wherein generating a new brightness value for each of the plurality of filtered pixels as a function of respective brightness values for the set of unfiltered pixels comprises determining the arithmetic mean of the two pixels adjacent to the pixel along the selected axis.

13. The method of claim 8, wherein the plurality of axes includes a vertical axis, a horizontal axis, a first diagonal axis, and a second diagonal axis.

14. The method of claim 8, wherein generating a new brightness value for each of the plurality of filtered pixels as a function of respective brightness values for the set of unfiltered pixels comprises selecting the set of unfiltered pixels as the two pixels adjacent to the pixel along the axis having the lowest curvature.

15. The method of claim 14, wherein generating a new brightness value for each of the plurality of filtered pixels as a function of respective brightness values for the set of unfiltered pixels comprises computing an arithmetic mean of the brightness values for the set of unfiltered pixels.

* * * * *